(12) United States Patent
Fukuhara et al.

(10) Patent No.: US 7,222,530 B2
(45) Date of Patent: May 29, 2007

(54) NON-CONTACT TYPE LIQUID LEVEL SENSOR AND NON-CONTACT TYPE LIQUID LEVEL DETECTING METHOD

(75) Inventors: Toshiaki Fukuhara, Shimada (JP); Kenichi Tanaka, Shimada (JP)

(73) Assignee: Yazaki Corporation, Tokyo (JP)

( * ) Notice: Subject to any disclaimer, the term of this patent is extended or adjusted under 35 U.S.C. 154(b) by 9 days.

(21) Appl. No.: 11/123,036

(22) Filed: May 6, 2005

(65) Prior Publication Data

US 2005/0247128 A1    Nov. 10, 2005

(30) Foreign Application Priority Data

May 7, 2004    (JP)    ............... P2004-138591

(51) Int. Cl.
*G01F 23/38*    (2006.01)
(52) U.S. Cl. ...................................... 73/317
(58) Field of Classification Search ............... None
See application file for complete search history.

(56) References Cited

U.S. PATENT DOCUMENTS

2004/0003660 A1    1/2004    Fukuhara et al.

2004/0204870 A1*    10/2004    Schimnowski et al. ....... 702/45
2005/0120793 A1*    6/2005    Cochran et al. .............. 73/313

FOREIGN PATENT DOCUMENTS

| DE | 197 51 210 A1 | 5/1999 |
| DE | 101 56 479 A1 | 5/2003 |
| EP | 0 295 609 A2 | 12/1988 |
| EP | 1 223 413 A2 | 7/2002 |
| EP | 1 376 077 A2 | 1/2004 |
| JP | 2004-20538 A | 1/2004 |
| WO | WO 00/52425 A1 | 9/2000 |

* cited by examiner

*Primary Examiner*—Hezron Williams
*Assistant Examiner*—Paul M. West
(74) *Attorney, Agent, or Firm*—Sughrue Mion, PLLC

(57) ABSTRACT

A memory which stores an output value indicating a liquid level is provided in a Hall-effect IC, and an uppermost position and a lowermost position of a float, which are set in advance, are written to the memory as an uppermost liquid level and a lowermost liquid level using a reference position writing jig.

7 Claims, 3 Drawing Sheets

NON-CONTACT TYPE LIQUID LEVEL SENSOR AND NON-CONTACT TYPE LIQUID LEVEL DETECTING METHOD

BACKGROUND OF THE INVENTION

The present invention relates to a non-contact type liquid level sensor and a non-contact type liquid level detecting method and, more particularly, to a non-contact type liquid level sensor and a non-contact type liquid level detecting method which are adapted to write output values which correspond, respectively, to an uppermost position and a lowermost position of the float, which are set in advance, to a memory and then to detect with high accuracy a liquid level corresponding to the position of a float by making use of data within the memory.

In a liquid level sensor which is installed in an automotive fuel tank of an automobile for detecting the volume of stored liquid fuel therein, the motion of a float arm adapted to rotate according to the movement of a float is grasped as a change in electric resistance value so as to output a voltage according to the variation, so that the resulting fuel level is indicated on a measuring instrument.

In this liquid level sensor, a contact on a contact piece mounted on an arm holder which supports a float arm is brought into slide contact with a resistor on an insulating substrate provided on a frame (a casing). Consequently, a voltage value obtained according to the motion of the float arm or the slide contact position of the contact on the contact piece corresponds to the liquid level (for example, refer to Patent Document 1).

In the non-contact type liquid level sensor of this type, the contact and the resistor are oxidized or partially worn out to thereby call for a variation in resistance value or constitute a cause for generation of noise, eventually causing a problem that the detection accuracy of the liquid level is gradually deteriorated.

To cope with this, there has been proposed a non-contact type liquid level sensor which uses a magnetoelectric converting element such as a Hall-effect element. The non-contact type liquid level sensor of this kind is used as a level sensor for monitoring the volume of liquid fuel of an automobile, for example. In this non-contact type liquid level sensor, a change in magnetic field of a magnet adapted to rotate according to the movement of a float is detected by the magnetoelectric converting element and a magnetoelectric conversion signal (an electric signal) according to the change in magnetic field is outputted. In addition, the liquid level is displayed on a measuring instrument based on the magnetoelectric conversion signal.

In addition, in recent years, a Hall-effect IC to which a function to perform processes for correcting and amplifying magnetoelectric conversion outputs is added is used as the magnetoelectric converting element. This Hall-effect IC writes a magnetoelectric conversion output value corresponding to the rotational angle of a float arm being provided with a float to a memory and further makes a liquid level corresponding to the output value be displayed on a measuring instrument.

Consequently, by writing an uppermost position and a lowermost position which constitute limits to which the float can move upwards and downwards, respectively, to the memory of the Hall-effect IC, an output value corresponding to an actually measured position of the float between the uppermost position F and the lowermost position E thereof can be outputted as a liquid level, as shown in FIG. 3. As this occurs, the uppermost position F and the lowermost position E are determined by stoppers which restrict the rotational quantity of a float arm being provided with a float at a distal end thereof.

FIG. 4 is a conceptual drawing showing the construction of a non-contact type liquid level sensor 11 having a Hall-effect IC such as the one described above. This non-contact type liquid level sensor 11 takes a form in which one end of a float arm 13 is rotatably supported substantially at a central portion of a casing 12, which constitutes a sensor main body.

This float arm 13 is made of a metal rod which is bent to be formed into an L-like shape as a whole, and the float arm 13 so bent is further bent to be formed into a V-like shape at a predetermined portion from the one end thereof, so that a locking rod portion 13a is formed which is adapted to be brought into face contact with stoppers 14, 15 as appropriate.

A float 16 is fixed to a distal end (the other end) of the float arm 13 with a push nut or the like. The float is made of a material exhibiting a buoyant force relative to a liquid to be measured.

The stoppers 14, 15 are arranged so as to form a shape in which an upper isosceles triangle and a lower isosceles triangle are brought into abutment with each other at vertexes thereof, and positions where the locking rod portion 13a is brought into contact with sides a, b of the stoppers 14, 15 which face the locking rod portion 13a are made to be an uppermost position F and a lowermost position E of the float 16, respectively.

On the other hand, provided in the casing 12 as shown in FIG. 5 are a rotational shaft 17 which holds (fixes) the one end of the float arm 13, a magnet 18 provided integrally around an outer circumference of the rotational shaft 17, a pair of stators 19 which are disposed on a perimeter of the magnet 18 and an Hall-effect IC 20 interposed between the respective stators 19 (in a gap between the stators).

In this liquid level sensor 11, the float arm 13, which is adapted to rotate as the float 16 fluctuates, rotates the rotational shaft 17, which is fixed thereto, and the magnet 18. Due to this, the Hall-effect IC 20 detects a change in magnetic flux which follows a magnetizing pattern of the magnet 18 and outputs a corresponding electric signal.

The Hall-effect IC obtains a moving position of the float 16 within an area between the uppermost position and the lowermost position that have been written to the memory, or a rotational position of the float arm 13, and outputs an electric signal which corresponds to the change in magnetic flux so detected.

Patent Document 1: JP-A-2004-20538

Since the related non-contact type liquid level sensor is constructed as has been described heretofore, in the event that there are dispersions in dimension with respect to the constructions and mounting of the stoppers 14, 15, which restrict the quantity of movement (rotation) of the float arm 13, and the float arm 13, or dispersions with respect to input and output characteristics of the Hall-effect IC 20, output values from the Hall-effect IC become inaccurate.

Namely, when writing output values (a straight line A) which correspond to the uppermost position F and the lowermost position E as shown in FIG. 6, due to dispersions in dimension of the stoppers 14, 15, output values indicated by a straight line B are written, in reality, as shown in FIG. 6. Consequently, an output value obtained for each float position based on the dispersed output values or a liquid level value which is finally outputted as a measured value and an indicated value becomes unreliable.

SUMMARY OF THE INVENTION

The invention was made in view of the problematic situations, and an object thereof is to provide a non-contact type liquid level sensor and a non-contact type liquid level detecting method which are adapted to write, using a reference positions writing jig which is such as to set an uppermost position and a lowermost position of a float as reference positions, output values corresponding, respectively, to the reference positions to a memory of a magnetoelectric converting elements as reference data and then to output a liquid level signal corresponding to each float position in accordance with the reference data.

In order to accomplish the above object, a non-contact type liquid level sensor and a non-contact type liquid level detecting method of the present invention are characterized by having the following arrangement.

(1) A non-contact type liquid level sensor comprising:
- a housing;
- a rotational shaft that is rotatably provided in the housing;
- a magnet that is fixed to an outer circumferential surface of the rotational shaft in such a manner as to rotate together with the rotational shaft;
- a pair of stators that are disposed in the housing so as to face to an outer circumferential surface of the magnet;
- a float arm that comprises one distal end on which a float is provided, and the other distal end which is supported at the rotational shaft; and
- a magnetoelectric converting element that is disposed in the housing, magnetically detects a moving position of the float arm, and outputs an electric signal indicating a liquid level according to the moving position, wherein
- the magnetoelectric converting element comprises a memory which stores an output value with respect to the liquid level,
- the memory stores a predetermined uppermost position and a predetermined lowermost position of the float as an uppermost liquid level and a lowermost liquid level, respectively, and
- output values respectively corresponding to the uppermost position and the lowermost position of the float are set so as to be saturated in an area which is higher than the uppermost position and an area which is lower than the lowermost position, respectively.

(2) A non-contact type liquid level sensor according to (1), wherein the uppermost position and the lowermost position are made to fall within tolerances of the uppermost liquid level and the lowermost liquid level, respectively.

(3) A non-contact type liquid level sensor according to (2) further comprising:
- a reference position writing jig that makes the uppermost position and the lowermost position to fall within the tolerances of the uppermost liquid level and the lowermost liquid level, respectively.

(4) A non-contact type liquid level sensor according to (3), wherein the reference position writing jig has horizontal support surfaces which support the float so as to set the uppermost position and the lowermost position as references, respectively.

(5) A method of detecting a liquid level comprising:
- magnetically detecting a moving position of a float arm that comprises one distal end on which a float is provided, by a magnetoelectric converting element;
- setting an uppermost position and a lowermost position of the float as references;
- storing the uppermost position and the lowermost position in a memory provided in the magnetoelectric converting element as an uppermost liquid level and a lowermost liquid level, respectively; and
- outputting an output value corresponding to the moving position based on the uppermost liquid level and the lowermost liquid level and output values corresponding to the uppermost liquid level and the lowermost liquid level, respectively.

(6) A method of detecting a liquid level according to (5), wherein in the setting step, the uppermost position and the lowermost position of the float are set by a reference position writing jig.

According to the non-contact type liquid level sensor that is constructed as has been described above, even in the event that there are dispersions with respect to the constructions and mounting of the stoppers and the float or dispersions with respect to input and output characteristics of the magnetoelectric converting element, the position of the float, which moves between the respective reference values representing the uppermost position and the lowermost position of the float, or a change in liquid level can be detected and displayed with high accuracy.

In addition, in the area where the float exceeds the set uppermost position or lowermost position thereof, the output value is made to be maintained at the value resulting when the float is situated at the uppermost position or the lowermost position irrespective of the rotational quantity of the float arm, whereby even in the event that the float moves beyond the reference value position, the output value corresponding to the associated reference position can be made to be outputted continuously as the value at the uppermost position or the lowermost position.

According to the non-contact type liquid level sensor that is constructed as has been described above, predetermined liquid levels in the vicinity of the uppermost liquid level and the lowermost liquid level in a storage tank or the like which do not exceed, respectively, the uppermost liquid level and the lowermost liquid level so that the float does not rise or drop beyond the uppermost position or the lowermost position thereof, whereby the respective outputs corresponding to the uppermost position and the lowermost position are prevented from becoming unstable.

According to the non-contact type liquid level sensor that is constructed as has been described above, since, by making use of the reference position writing jig with respect to a liquid level sensor that is placed in every liquid storage tank, the reference values for the uppermost position and the lowermost position of the float are set within the rotational range of the float arm, all the output values corresponding, respectively, to the reference values also become the same values.

According to the non-contact type liquid level sensor that is constructed as has been described above, the reference values for the uppermost position and the lowermost position of the float in the storage tank can be set easily only by making the float or the float arm be supported on the two upper and lower horizontal support surfaces for the uppermost position and the lowermost position, respectively.

According to the non-contact type liquid level detecting method that is configured as has been described above, even in the event that there are dispersions with respect to the construction and mounting of the stoppers and the float or dispersions with respect to the input and output characteristics of the magnetoelectric converting element, the position of the float which moves between the respective reference values or the change in liquid level can be detected and displayed with high accuracy. In addition, by making use of the reference position writing jig, the setting of the uppermost position and the lowermost position of the float with respect to respective liquid level sensors provided in a plurality of storage tanks can be implemented quickly.

Since the non-contact type liquid level sensor and the non-contact type liquid level detecting method according to the invention are constructed such that the outputs of the magnetoelectric converting element which correspond, respectively, to the uppermost position and the lowermost position of the float which are set in advance are written to the memory, the output values from the memory which correspond to the position of the float which moves between the uppermost position and the lowermost position can be outputted with high accuracy independently of the dispersions with respect to the dimensions of the float arm or the like and the dispersions with respect to the characteristics of the magnetoelectric converting element. Consequently, the same output values can be obtained for liquid level sensors which are placed in a plurality of storage tanks by using the set values which are all set to the same value for the uppermost positions and the lowermost positions in the plurality of storage tanks as references. Consequently, a liquid level corresponding to an actually measured float position can be detected and displayed with accuracy.

DETAIL DESCRIPTION OF PREFERRED EMBODIMENTS

Hereinafter, an embodiment of a non-contact type liquid level sensor according to the invention will be described by reference to the accompanying drawings.

Figure 1:
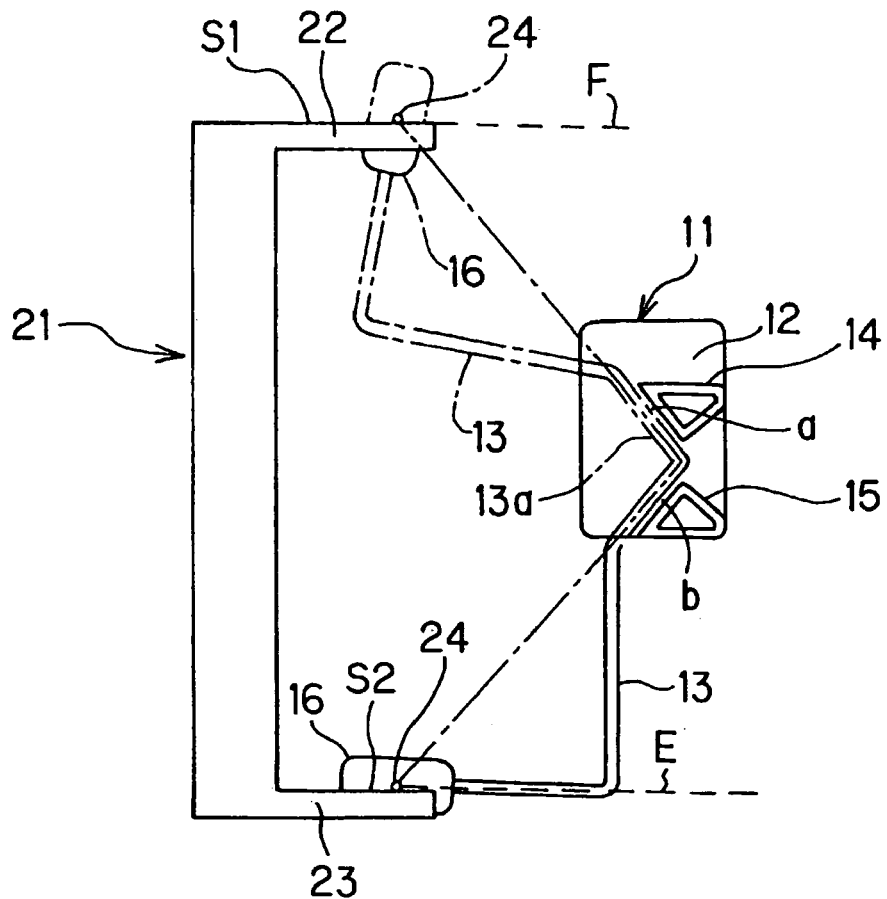
FIG. 1 is a drawing showing the construction of a non-contact type liquid level sensor according to an embodiment of the invention.

FIG. 1 is a drawing showing the construction of a non-contact type liquid level sensor 11 according to an embodiment of the invention. This non-contact type liquid level sensor 11 takes a form in which one end of a float arm 13 is rotatably supported substantially at a central portion of a casing 12, which constitutes a sensor main body. This float arm 13 is made of a metal rod which is bent to be formed into an L-like shape as a whole, and the float arm 13 so bent is further bent to be formed into a V-like shape at a predetermined portion from the one end thereof, so that a locking rod portion 13a is formed which is adapted to be brought into face contact with stoppers 14, 15 as appropriate. A float 16 is fixed to a distal end (the other end) of the float arm 13 with a push nut or the like. The float is made of a material exhibiting a buoyant force relative to a liquid to be measured.

The stoppers 14, 15 are arranged so as to form a shape in which an upper isosceles triangle and a lower isosceles triangle are brought into abutment with each other at vertexes thereof and function such that confronting faces a, b thereof which confront the locking rod portion 13a, regulate a maximum moving quantity of the locking rod portion 13a. Namely, the stoppers 14, 15 function to restrict the excessive rise (clockwise rotation) and drop (counterclockwise rotation) of the float arm 13. Consequently, the stoppers 14, 15 are not such as to set the uppermost position and the lowermost position of the float as the reference positions for writing output values.

Figure 5:
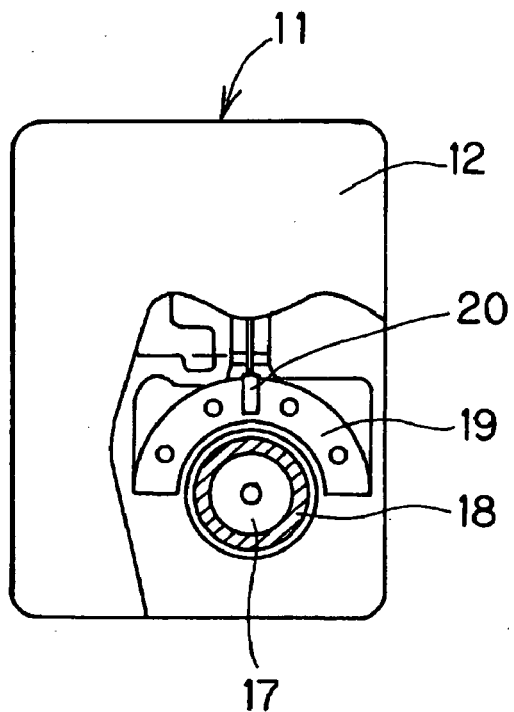
FIG. 5 is a front view of the related non-contact type liquid level sensor showing an interior construction thereof.
Figure 6:
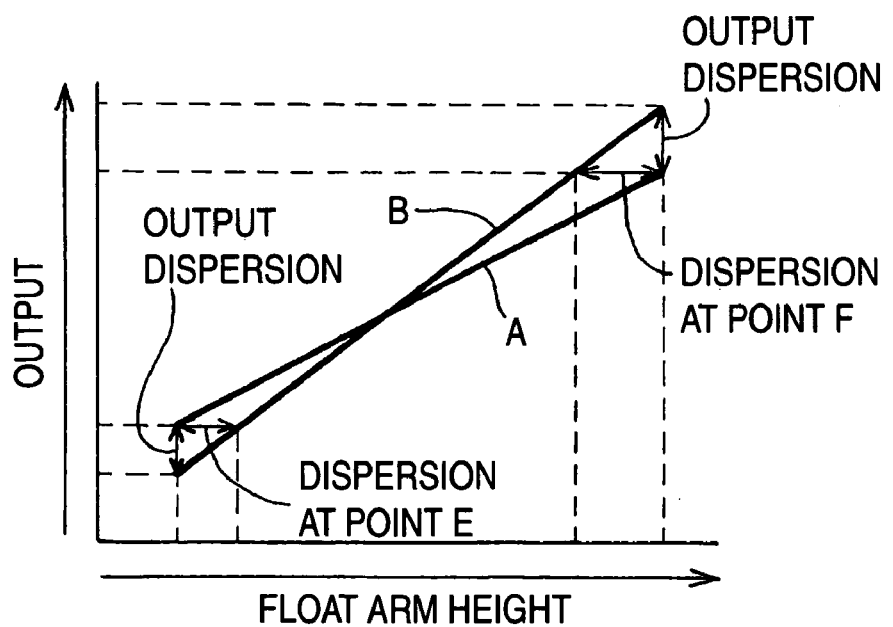
FIG. 6 is a graph illustrating an output error of the Hall-effect IC of the related non-contact type liquid level sensor.

In addition, provided in the casing 12 as also shown in FIG. 5 are a rotational shaft 17 which holds (fixes) the one end of the float arm 13, a magnet 18 provided integrally around an outer circumference of the rotational shaft 17, a pair of stators 19 which are disposed on a perimeter of the magnet 18 and an Hall-effect IC 20 which is interposed between the respective stators 19 (in a gap between the stators) and to which a function to perform processes for correcting and amplifying magnetoelectric conversion outputs is added.

In this liquid level sensor 11, the float arm 13, which is adapted to rotate as the float 16 fluctuates, rotates the rotational shaft 17 and the magnet 18. Due to this, the Hall-effect IC detects a change in magnetic flux which follows a magnetizing pattern of the magnet 18 and outputs a corresponding electric signal.

In FIG. 1, reference numeral 21 denotes a reference position writing jig. This reference position writing jig 21 is made use of to write output values (electric signals) which correspond to reference values for the uppermost position and the lower most position of the float to a memory of the Hall-effect IC. Consequently, an output value which corresponds to a moving position of the float within a segment between the uppermost position and the lowermost position thereof can be outputted based on the outputs corresponding to the reference values. Since this output value is such as to be obtained based on the reference values, the accuracy thereof is high.

This reference position writing jig 21 is formed into, for example, a U-like shape as shown in the drawing, and the shape is such as to have horizontal upper support piece 22 and lower support piece 23. Here, the upper support piece 22 and the lower support piece 23 have horizontal support surfaces S1, S2 which support the float 16 and a part of the float arm 13 (In FIG. 1, a pin 24 provided at a central portion of the float 16).

The distance between these horizontal support surfaces S1, S2 is determined in advance depending on types of liquid storage tanks, and in this invention, the distance is set such that the horizontal surfaces S1, S2 are situated in the vicinity of an uppermost liquid level and a lowermost liquid level of liquid that can be stored within this liquid storage tank. To be specific, in consideration of a point that the float 16 be allowed to move smoothly as the liquid level changes, the horizontal support surfaces S1, S2 are set, respectively, to a reference surface F which is, for example, on the order of 5 mm below the uppermost liquid level of the liquid and a reference surface E which is, for example, on the order of 5 mm above the lowermost liquid level of the liquid. Thus, tolerance values for the reference surfaces F, E are set, and written output values corresponding, respectively, to the reference surfaces F, E are made to fall within the tolerances, whereby reference output values which are outputted at the uppermost position and the lowermost position of the float 16 can be highly reliable values.

On the other hand, the non-contact type liquid level sensor of the invention has the Hall-effect IC 20 which magnetically detects the position of the float 16 (the rotational position of the float arm 13) as has been said before. This Hall-effect IC 20 adds a signal indicating the magnetically detected float position to a process by written information that is stored in the memory so as to output a liquid level signal.

In the invention, Hall-effect IC outputs, which correspond to the uppermost position and the lowermost position of the float 16 which can be obtained when the pin 24 comes to rest on the horizontal support surfaces S1, S2 of the reference position writing jig 21, are written to the memory of the Hall-effect IC 20. Consequently, the position of the liquid level which changes after the tank is filled with liquid, that is, the position of the float can be obtained accurately based on reference information that is obtained from the reference positions F, E which are written to the memory and outputs. Due to this, highly reliable liquid level measurement and display can be effected without being affected by dispersions with respect to the mounting and dimensions of the stoppers 14, 15 and the float arm 13.

Figure 2:
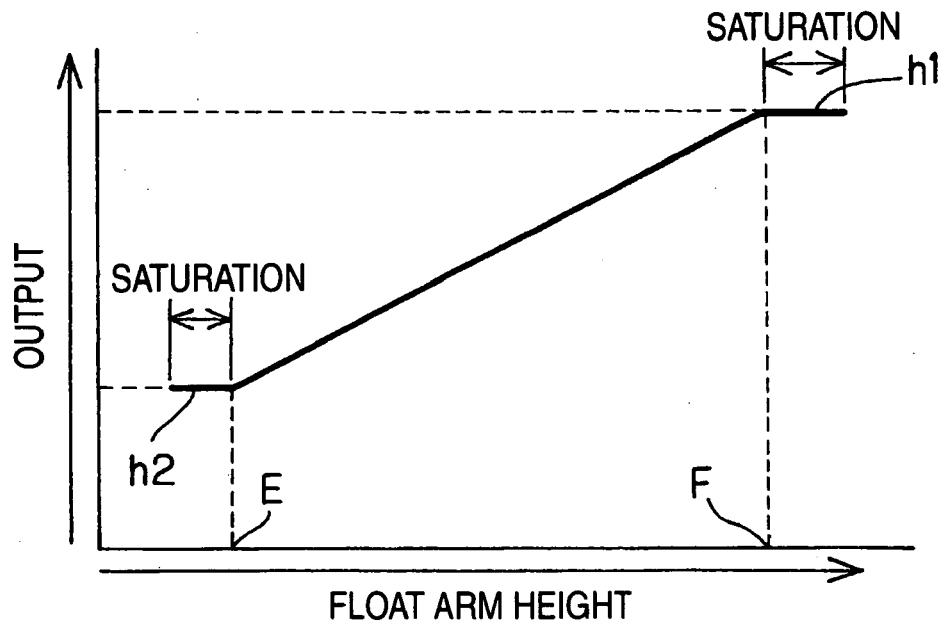
FIG. 2 is a graph illustrating output characteristics that are used at a Hall-effect IC of the invention.
Figure 3:
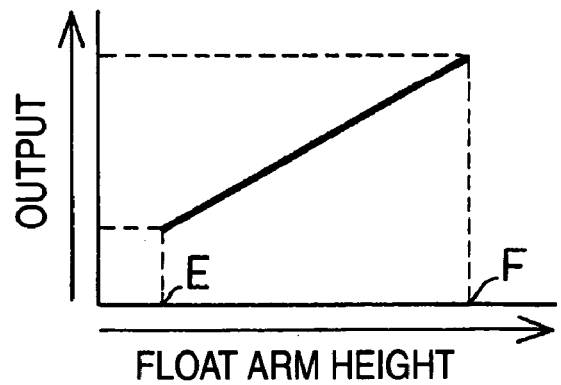
FIG. 3 is a graph illustrating output characteristics that are used at a related Hall-effect IC.
Figure 4:
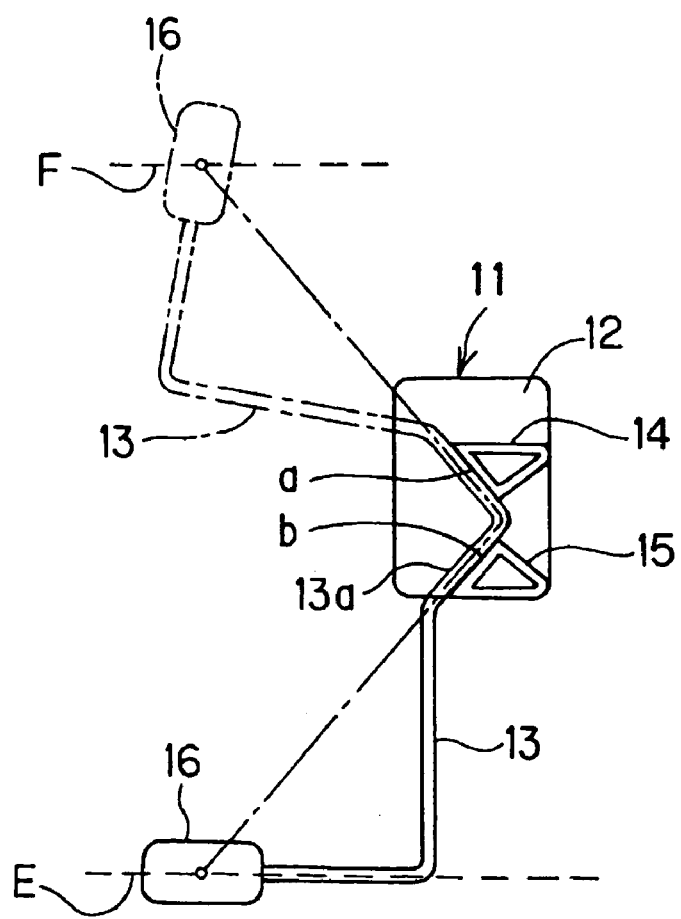
FIG. 4 is a drawing showing the construction of a related non-contact type liquid level sensor.

Note that in an actual operation, since the stoppers 14, 15 do not restrict upper and lower limits of the float arm 13, there may occur a case where the float 16 rises or lowers beyond the reference surfaces F, E. However, since the areas where the float 16 rises or lowers in such a manner are areas where the normal movement of the float 16 is possibly disturbed as is described above, output values are made to be saturated, as indicated by h1, h2 in FIG. 2, in accordance with a preset program as an internal process within the Hall-effect IC 20.

According to the embodiment, by providing to the Hall-effect IC 20 the memory which stores output values indicating liquid levels and writing thereto the uppermost position F and the lowermost position E of the float 16, which are set in advance by the reference position writing jig 21, as the uppermost liquid level and the lowermost liquid level thereof, respectively, even in the event that there occur dispersions with respect to the construction and mounting of the stoppers 14, 15 and the float 16 or dispersions with respect to the input and output characteristics of the Hall-effect IC 20, the position of the float 16 which moves between the uppermost position and the lowermost position, that is, the liquid level can be detected and displayed with high accuracy. In addition, even in the event that data on the uppermost position and the lowermost position are attempted to be written to the Hall-effect IC's 20 of the liquid level sensors 11 which are placed in a plurality of storage tanks using the reference position writing jig 21, output values, all of which are the same, can be obtained.

In addition, by making the output values corresponding, respectively, to the uppermost liquid level and the lowermost liquid level of the float 16 fall within the tolerances, the predetermined liquid levels, which do not exceed the uppermost level and the lowermost level of liquid in the tank or the like but stays in the vicinity of thereof, can be set as the uppermost level and the lowermost level of the float 16 so that the float 16 does not rise or lower beyond the uppermost liquid level or the lowermost liquid level.

In addition, by setting the output values corresponding, respectively, to the uppermost position and the lowermost position of the float 16 such that they are saturated in the area which becomes higher than the uppermost position and the area which becomes lower than the lowermost position, respectively, even in the event that the float 16 moves beyond the set reference value, the output value corresponding to the set reference value can continue to be outputted.

Additionally, by providing the horizontal support surfaces S1, S2 which support the float 16 to the reference position writing jig 21 in order to set the uppermost position and the lowermost position of the float 16 as the references, the reference levels for the uppermost position and the lowermost position of the float 16 can be set easily only by allowing the float 16 or the float arm 13 to be supported on the horizontal support surfaces S1, S2.

In addition, only by allowing the float 16 or the float arm 13 to be supported on the two vertical uppermost and lowermost reference support surfaces, the uppermost and lowermost reference levels of the float 16 can be set easily.

What is claimed is:

1. A non-contact type liquid level sensor comprising:
 a housing;
 a rotational shaft that is rotatably provided in the housing;
 a magnet that is fixed to an outer circumferential surface of the rotational shaft in such a manner as to rotate together with the rotational shaft;
 a pair of stators that are disposed in the housing so as to face to an outer circumferential surface of the magnet;
 a float arm that comprises one distal end on which a float is provided, and the other distal end which is supported at the rotational shaft; and
 a magnetoelectric converting element that is disposed in the housing, magnetically detects a moving position of the float arm, and outputs an electric signal indicating a liquid level according to the moving position, wherein
 the magnetoelectric converting element comprises a memory which stores an output value with respect to the liquid level,
 the memory stores a desired uppermost position and a desired lowermost position of the float as an uppermost liquid level and a lowermost liquid level, respectively, and
 output values respectively corresponding to the desired uppermost position and the desired lowermost position of the float are set so as to be saturated in an area which is higher than the desired uppermost position and an area which is lower than the desired lowermost position, respectively.

2. A non-contact type liquid level sensor according to claim 1, wherein the desired uppermost position and the desired lowermost position are made to fall within tolerances of the uppermost liquid level and the lowermost liquid level, respectively.

3. A non-contact type liquid level sensor according to claim 2 further comprising:
 a reference position writing jig that makes the desired uppermost position and the desired lowermost position to fall within the tolerances of the uppermost liquid level and the lowermost liquid level, respectively.

4. A non-contact type liquid level sensor according to claim 3, wherein the reference position writing jig has horizontal support surfaces which support the float so as to set the desired uppermost position and the desired lowermost position as references, respectively.

5. A method of detecting a liquid level comprising:
 magnetically detecting a moving position of a float arm that comprises one distal end on which a float is provided, by a magnetoelectric converting element;
 setting an uppermost position and a lowermost position of the float as references;

storing the uppermost position and the lowermost position in a memory provided in the magnetoelectric converting element as an uppermost liquid level and a lowermost liquid level, respectively; and outputting an output value corresponding to the moving position based on the uppermost liquid level and the lowermost liquid level and output values corresponding to the uppermost liquid level and the lowermost liquid level, respectively, wherein output values respectively corresponding to the uppermost position and the lowermost position of the float are set so as to be saturated in an area which is higher than the uppermost position and an area which is lower than the lowermost position, respectively.

6. A method of detecting a liquid level according to claim 5, wherein in the setting step, the uppermost position and the lowermost position of the float are set by a reference position writing jig.

7. A method of detecting a liquid level comprising:

magnetically detecting a moving position of a float arm that comprises one distal end on which a float is provided, by a magnetoelectric converting element;

setting an uppermost position and a lowermost position of the float as references;

storing the uppermost position and the lowermost position in a memory provided in the magnetoelectric converting element as an uppermost liquid level and a lowermost liquid level, respectively; and outputting an output value corresponding to the moving position based on the uppermost liquid level and the lowermost liquid level and output values corresponding to the uppermost liquid level and the lowermost liquid level, respectively, wherein in the setting step, the uppermost position and the lowermost position of the float are set by a reference position writing jig.

* * * * *